(12) United States Patent
Berkness et al.

(10) Patent No.: US 9,950,574 B2
(45) Date of Patent: Apr. 24, 2018

(54) APPARATUS FOR DELIVERING AIR THROUGH POWERED AXLE ASSEMBLIES

(71) Applicant: Airgo IP, LLC, Oklahoma City, OK (US)

(72) Inventors: Kyle J. Berkness, Savage, MN (US); Phillip K. Berkness, Savage, MN (US)

(73) Assignee: AIRGO IP, LLC, Oklahoma City, OK (US)

( * ) Notice: Subject to any disclaimer, the term of this patent is extended or adjusted under 35 U.S.C. 154(b) by 0 days.

(21) Appl. No.: 15/341,692

(22) Filed: Nov. 2, 2016

(65) Prior Publication Data
US 2017/0072751 A1    Mar. 16, 2017

Related U.S. Application Data

(62) Division of application No. 14/328,617, filed on Jul. 10, 2014, now Pat. No. 9,511,635.

(51) Int. Cl.
| | |
|---|---|
| *B60B 23/00* | (2006.01) |
| *B60C 23/00* | (2006.01) |
| *B60B 27/00* | (2006.01) |
| *B60B 27/06* | (2006.01) |

(52) U.S. Cl.
CPC ........ *B60C 23/003* (2013.01); *B60B 27/0047* (2013.01); *B60B 27/0073* (2013.01); *B60B 27/06* (2013.01)

(58) Field of Classification Search
CPC .............. B60C 23/003; B60B 27/0047; B60B 27/0073; B60B 27/06
See application file for complete search history.

(56) References Cited

U.S. PATENT DOCUMENTS

| | | | | |
|---|---|---|---|---|
| 1,602,467 A * | 10/1926 | Sword | ........ | B60C 23/003 200/82 D |
| 1,794,900 A * | 3/1931 | Hutchinson | ........ | B60C 23/003 152/417 |
| 4,418,737 A * | 12/1983 | Goodell | ........ | B60C 23/00 137/224 |
| 4,470,506 A * | 9/1984 | Goodell | ........ | B60C 23/001 152/416 |
| 6,182,727 B1 * | 2/2001 | Beesley | ........ | B60C 23/003 152/417 |
| 7,931,061 B2 * | 4/2011 | Gonska | ........ | B60C 23/003 152/417 |

(Continued)

*Primary Examiner* — James A Shriver, II
*Assistant Examiner* — Brian L Cassidy
(74) *Attorney, Agent, or Firm* — Hall Estill Attorneys at Law

(57) ABSTRACT

An apparatus for delivering air through a powered axle assembly for use in automatic tire inflation systems. The apparatus comprises a base attachable to a non-rotating structure within the axle assembly and having the drive axle extend therethrough. A rotor is mountable in the axle assembly for rotation with the drive axle and for forming an air chamber between the rotor and the base and extending about the drive axle. An annular sealing member in sealing engagement with the rotor and the base is disposed within the air chamber and is rotatable with the rotor and with respect to the base. The base includes at least one air inlet for delivering air in a radial direction into the air chamber and the rotor includes at least one air outlet for air flow out of the chamber.

9 Claims, 16 Drawing Sheets

(56) References Cited

U.S. PATENT DOCUMENTS

| | | | | |
|---|---|---|---|---|
| 9,452,644 B2* | 9/2016 | Keeney | ............... | B60C 23/003 |
| 9,511,635 B2* | 12/2016 | Berkness | ............... | B60C 23/003 |
| 9,539,865 B2* | 1/2017 | Lakin | ............... | B60C 23/003 |
| 2015/0098668 A1* | 4/2015 | Kattenberg | ............... | F16C 33/7896 |
| | | | | 384/130 |
| 2015/0290986 A1* | 10/2015 | Tsiberidis | ............... | B60C 23/003 |
| | | | | 152/417 |
| 2015/0352911 A1* | 12/2015 | Bittlingmaier | ............... | B60C 23/003 |
| | | | | 152/417 |

* cited by examiner

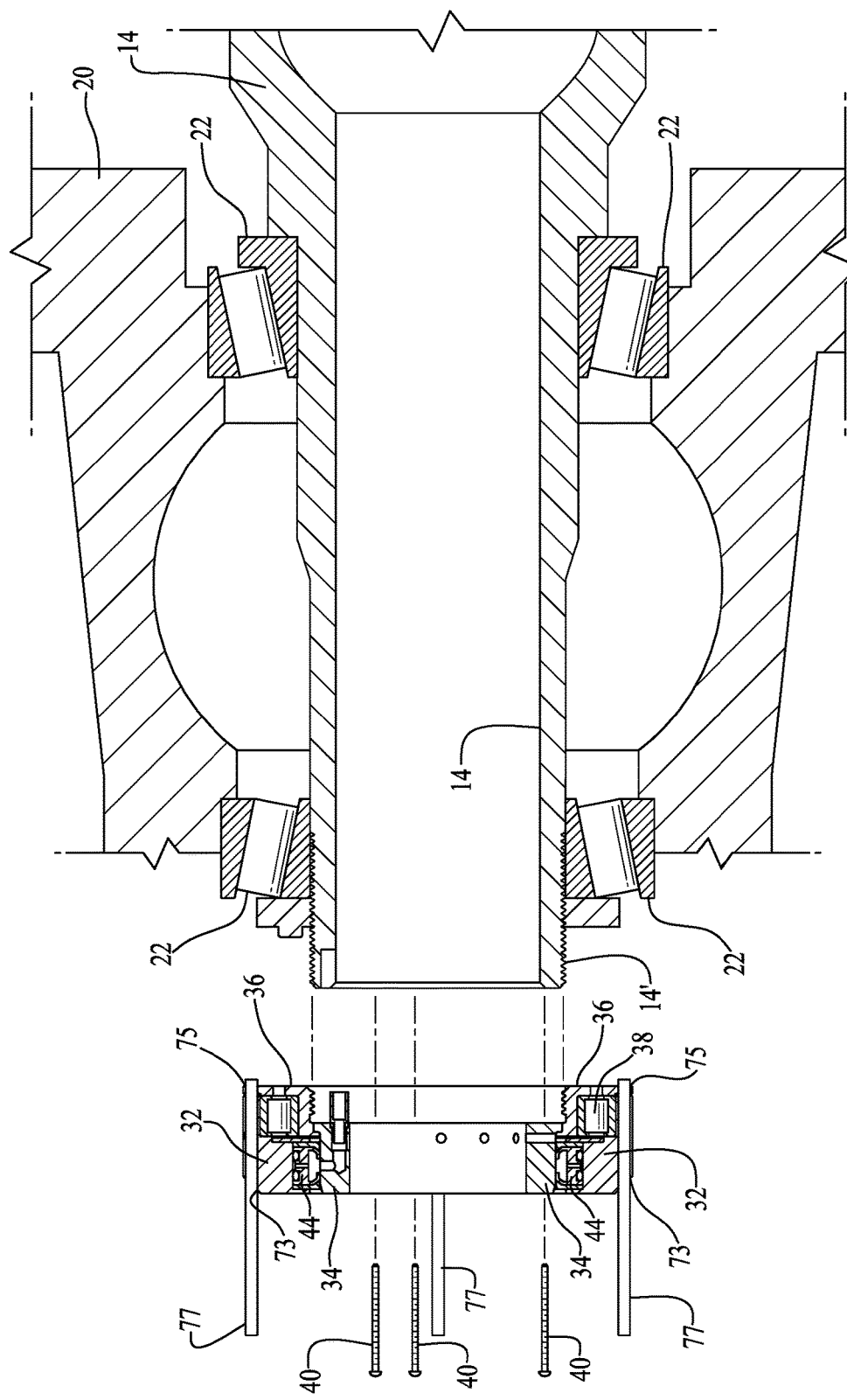

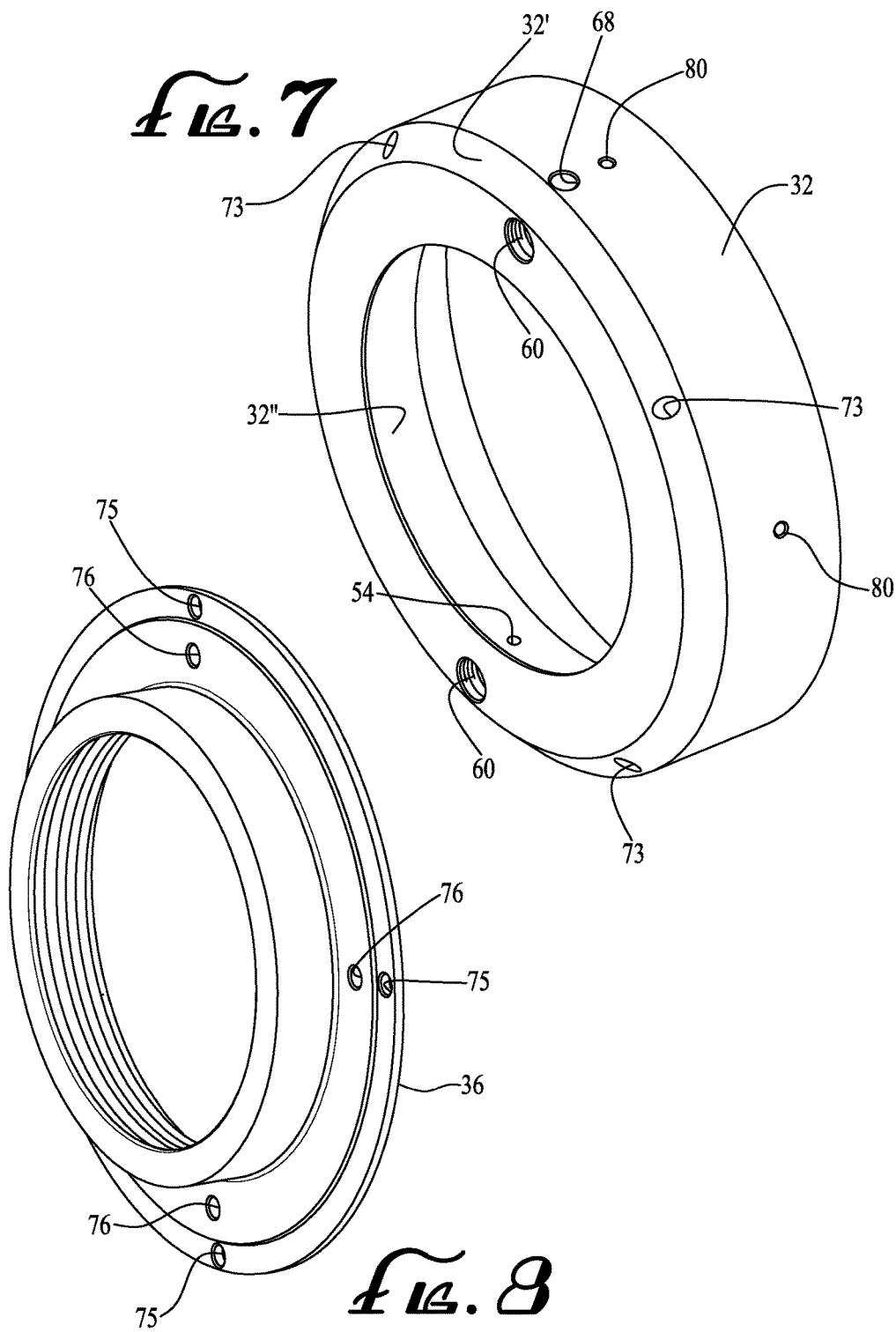

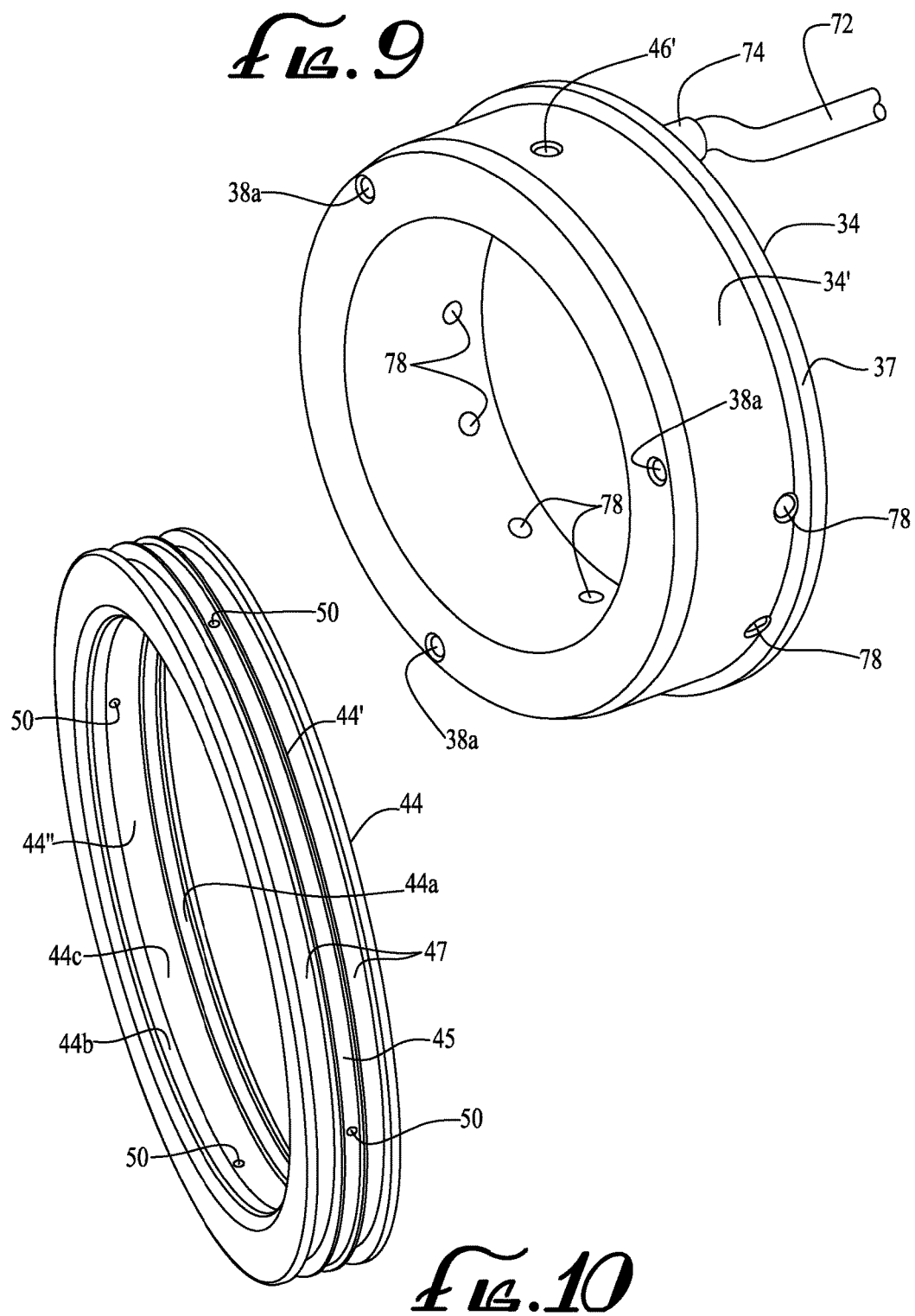

APPARATUS FOR DELIVERING AIR THROUGH POWERED AXLE ASSEMBLIES

CROSS-REFERENCE TO RELATED APPLICATIONS

This is a divisional application of pending U.S. patent application Ser. No. 14/328,617, filed on Jul. 10, 2014, entitled "Apparatus For Delivering Air Through Powered Axle Assemblies."

FIELD OF THE INVENTION

The present invention relates to apparatuses for delivering air through powered axle assemblies and to improved powered axle assemblies having such apparatuses incorporated therein.

BACKGROUND OF THE INVENTION

Onboard automatic tire inflation systems are currently available for use on trucks and other vehicles. Such systems have been successfully used in non-powered vehicle axle assemblies (i.e., the axle assemblies of trucks or other vehicles which do not include powered drive shafts linked to the vehicle differential or other drive system) to deliver make-up air to a vehicle tire in the event that the tire is punctured or begins to leak or for other reasons, e.g., controlling the tire pressure based on road conditions.

By way of example, an onboard system for maintaining a predetermined pressure in each of the tires of a non-powered truck tandem axle assembly is currently available from Airgo, Inc. of Edmond, Okla. The Airgo system delivers compressed air from an onboard compressor (e.g., the compressor used for supplying air to the truck brakes) to the interior of the tandem axle, or to a tube extending through the axle, in the event that a leak occurs in any of the four tandem axle tires. The Airgo system also includes: a pair of rotary seals provided proximate the outer ends of the non-powered tandem axle; a set of air lines extending from the rotary seals for delivering air from the interior of the axle, through the rotary seals, to each of the four tires; check valves provided in the air lines for preventing reserve air flow from the tires to the axle; and an indicator light which alerts the operator that a leak has developed. The system controls the make-up air flow in accordance with the operating pressure required by the tires. For most tandem truck axles, the automatic inflation system will typically be operable for providing a sufficient make-up air flow to maintain a tire pressure of at least 90 psig and more preferably at least 95 psig. An onboard automatic inflation system of this type is described, for example, in U.S. Pat. Nos. 6,105,645 and 7,418,892, the entire disclosures of which are incorporated herein by reference.

Although the rotary union assembly employed in the Airgo system allows the use of onboard automatic tire inflation systems in non-powered axle assemblies, the development of a commercially viable system which would allow the use of such onboard automatic tire inflation systems in the powered drive axle assemblies of trucks and other vehicles proved to be more problematic due to the presence of the rotating axle within the spindle. Commercially viable systems for non-powered axle assemblies were not adaptable for use on drive axles and the available drive axle systems usable on other types of vehicles had significant shortcomings and disadvantages. For example, such systems (a) would typically inflate only during a portion of the revolution of the tire or only when the vehicle was stationary, (b) could not operate at highway speeds, (c) did not provide continuous seal lubrication, (d) were not self contained, and/or (e) required external components which did not fit with the existing axle assembly.

Subsequently, Airgo, in cooperation with Oklahoma State University developed a new rotary union assembly for use in an automatic tire inflation system for powered drive axle assemblies which is the subject of U.S. Pat. No. 7,896,045, the entire disclosure of which also is incorporated herein by reference. While the new rotary union assembly operated as intended, it was comprised of multiple components, increasing its cost of manufacture and making it difficult to assemble and susceptible to leakage. The assembly also introduced air into the rotary union in an axial direction as was typical of the available rotary union assemblies for non-powered axle assemblies. The force of the axially directed incoming air tended to push outwardly on the rotary union and caused the components thereof to tend to separate in the axial direction which could result in the loss of the seal between the rotating and non-rotating components. This issue became more significant in the event of off center wheel mountings due to the resulting wobble of the rotating portions of the assembly with respect to the stationary portions. The combination of wobble and high pressure axial air flow can cause the seal to periodically disengage from its contact surface increasing the possibility of leakage. To reduce the wobble caused by off center mountings, customized spacers were employed for each axle variation, due to the inconsistencies in the distance from the front of the spindle to the back of the axle plate. Development efforts continued and the aforesaid shortcomings with the prior drive axle system have been obviated by the present invention.

SUMMARY OF THE INVENTION

The present invention provides an apparatus for delivering air through a powered axle assembly which satisfies the needs and alleviates the problems discussed above. The inventive apparatus can be used in conjunction with onboard automatic tire inflation systems currently available and will not interfere with the operation of the drive axle assembly. Moreover, the inventive apparatus can be readily adapted for maintaining inflation in individual tires or in the dual or other multiple tire sets of the powered axle assemblies of trucks and other vehicles.

In one aspect of the present invention, there is provided an apparatus for delivering air through a powered axle assembly, the powered axle assembly including a drive axle which extends through a non-rotating structure and is powered for rotation with respect to the non-rotating structure. The apparatus comprises a base attachable to a non-rotating structure and a rotor mountable for rotation with the drive axle such that the rotor will rotate with respect to the base and is configured to cooperate with the base so as to form an air chamber therebetween. The base includes at least one air inlet configured for delivering air into the air chamber in a radial direction and the rotor includes at least one air outlet for air flow out of the air chamber. An annular sealing member, preferably having a plurality of openings extending radially therethrough, is provided within the air chamber between said air inlet and said air outlet for forming a seal between the rotating rotor and the stationary base.

In another aspect of the present invention, there is provided an improved powered axle assembly including a drive axle which extends through a non-rotating structure and is powered for rotation with respect to the non-rotating structure. The improvement comprises a base attached to the non-rotating structure and a rotor mounted for rotation with the drive axle such that the rotor will rotate with respect to the base and is configured to cooperate with the base so as to form an air chamber therebetween. The base includes at least one air inlet configured for delivering air into the air chamber in a radial direction and the rotor includes at least one air outlet for air flow out of the air chamber. An annular sealing member, preferably having a plurality of openings extending radially therethrough, is provided within the air chamber between said air inlet and said air outlet for forming a seal between the rotating rotor and the stationary base.

In another aspect of both the improved apparatus and powered axle assembly of the present invention, an annular sealing member of the double-lip seal type having a plurality of openings extending radially therethrough is disposed within the air chamber formed between the rotor and the base and is positioned in a balanced disposition about the at least one air inlet in the base so as to form an efficient low friction seal between the rotating rotor and stationary base over a broad pressure range while uniformly distributing the axial forces generated by the air flow within the cavity thereby minimalizing the effect of any offset wheel mountings on the rotary seal and additional axial force to the wheel bearings.

In still another aspect of both the improved apparatus and powered axle assembly of the present invention, a support portion of the rotary union assembly is provided over the axle spindle, enhancing the otherwise limited space in drive axle designs between the end of the spindle and the internal face of the axle plate, allowing for the inclusion of bearings therebetween to reduce heat generated by contact between the moving and stationary parts and to cooperate with the annular sealing member to reduce any adverse effects of offset wheel mountings on the seal(s) formed by the sealing member.

In another aspect of both the improved apparatus and powered axle assembly of the present invention, the adhesive and cohesive properties of lubricating oil are utilized in combination with the centrifugal force generated by the rotating axle to draw oil provided about a lower portion of the axle outwardly therefrom, past the sealing member in the cavity between the rotor and base, effecting lubrication of the sealing member and dissipating heat generated by seal friction. The adhesive property in the oil causes it to adhere to the component parts to effect lubrication while the cohesive property of the oil allows the oil to be drawn by centrifugal force in a wick-like fashion to produce flow.

In still another aspect of the present invention, there is provided an apparatus for delivering air through a powered axle assembly, the powered axle assembly including a drive axle which extends through a non-rotating structure and is powered for rotation with respect to the non-rotating structure. The apparatus comprises a base, a locking ring for attaching the base to a non-rotating structure and a rotor mountable for rotation with the drive axle such that the rotor will rotate with respect to the base and the locking ring and is configured so as to define a radial projection extending between the base and locking ring. A pair of sealing members are disposed adjacent to and on opposed sides of the radial projection on the rotor, one of the sealing rings being carried by said base and the other sealing ring being carried by the locking ring. The base includes at least one air inlet configured for delivering air into the radial extension in the rotor in a radial direction and the rotor includes at least one air outlet for air flow outwardly therefrom in an axial direction. The sealing rings form seals between the rotating rotor and the stationary base and locking ring as the rotor undergoes rotation with respect to the base and locking ring.

In another aspect of the present invention, there is provided an improved powered axle assembly including a drive axle which extends through a non-rotating structure and is powered for rotation with respect to the non-rotating structure. The improvement comprises a base, a locking ring for attaching the base to a non-rotating structure and a rotor mountable for rotation with the drive axle such that the rotor will rotate with respect to the base and the locking ring and is configured so as to define a radial projection extending between the base and locking ring. A pair of sealing members are disposed adjacent to and on opposed sides of the radial projection on the rotor, one of the sealing rings being carried by said base and the other sealing ring being carried by the locking ring. The base includes at least one air inlet configured for delivering air into the radial extension in the rotor in a radial direction and the rotor includes at least one air outlet for air flow outwardly therefrom in an axial direction. The sealing rings form seals between the rotating rotor and the stationary base and locking ring as the rotor undergoes rotation with respect to the base and locking ring.

Further aspects, features, and advantages of the present invention will be apparent from the following detailed description taken in conjunction with the accompanying drawings.

BRIEF DESCRIPTION OF THE DRAWINGS

FIG. 6 is an enlarged exploded cutaway elevational side view of a portion of the air delivery apparatus of the present invention separated from the axle spindle and hub.

FIG. 7 is a perspective view of the rotor employed in the inventive apparatus of the present invention.

FIG. 8 is a perspective view of the locking ring employed in the inventive apparatus of the present invention.

FIG. 9 is a perspective view of the stator employed in the inventive apparatus of the present invention.

FIG. 10 is a perspective view of the annular double-lip seal employed in the inventive apparatus of the present invention.

DETAILED DESCRIPTION OF THE PREFERRED EMBODIMENTS

Figure 1:
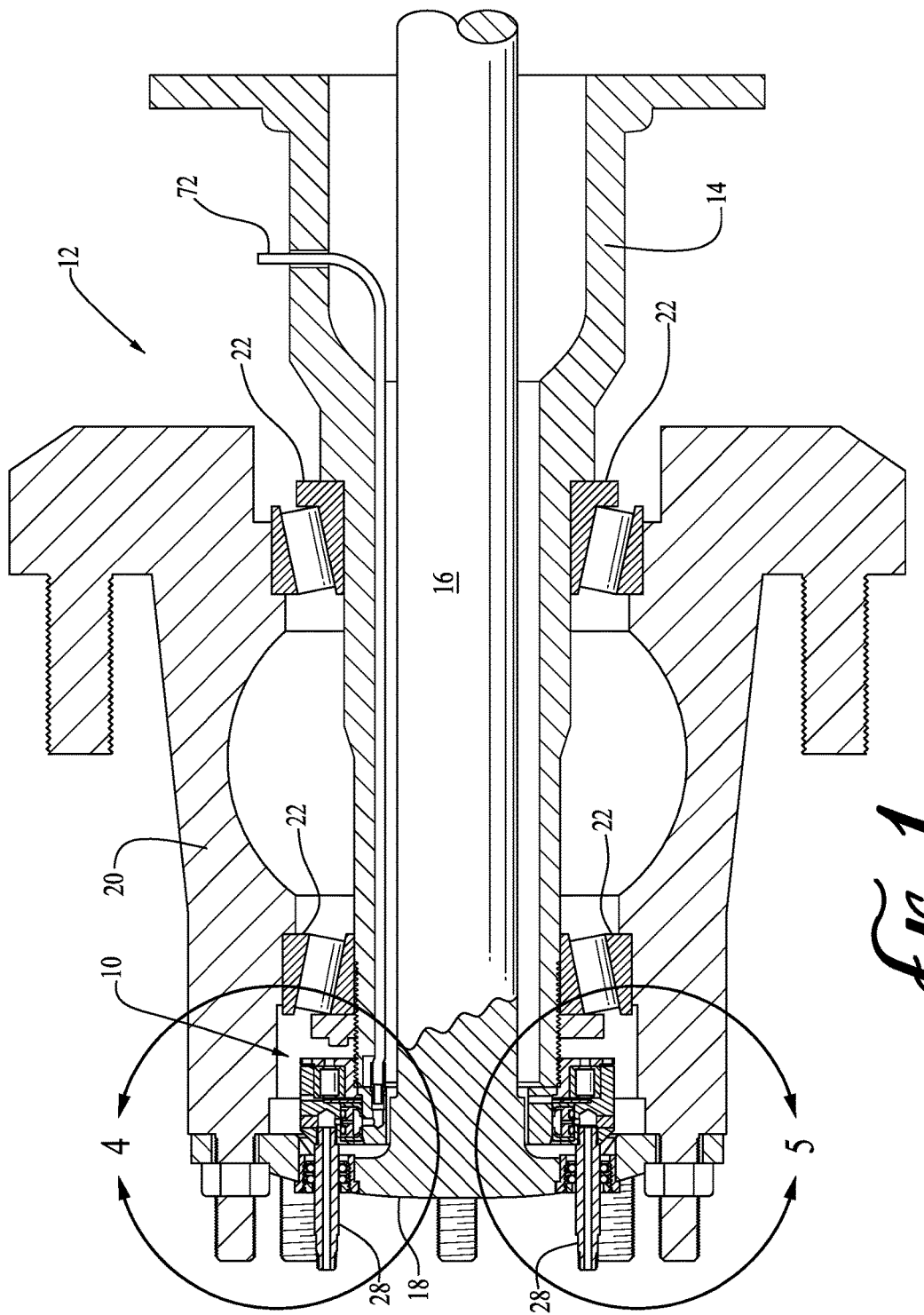
FIG. 1 is a cutaway elevational side view of a powered axle assembly having an embodiment of the delivery apparatus of the present invention incorporated therein.
Figure 2:
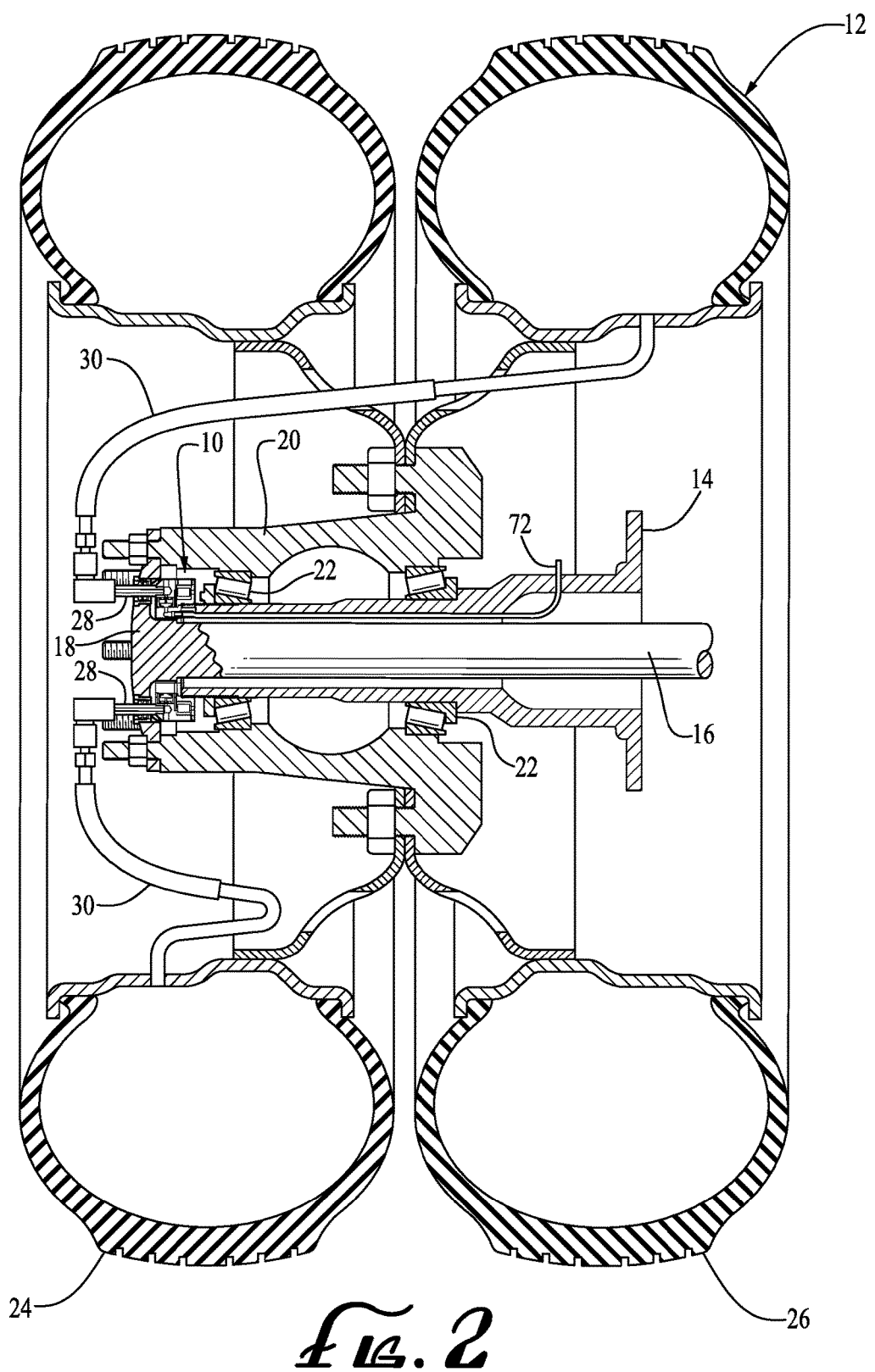
FIG. 2 is another cutaway elevational side view of a powered axle assembly having the inventive air delivery apparatus of the present invention incorporated therein.

A preferred embodiment of the inventive apparatus 10 for delivering air through a powered axle assembly is illustrated in FIGS. 1-10. The inventive apparatus 10, also referred to as a rotary union assembly, is shown in FIGS. 1 and 2 as installed in a typical powered tandem axle assembly 12 used on trucks and other vehicles. As will be understood by those skilled in the art, the powered axle assembly 12 comprises: a non-rotating structure 14 (e.g. a spindle or other housing); a powered drive axle 16 which extends through and rotates with respect to the non-rotating structure 14; a drive axle hub 18, also known as the axle plate, which is provided on the outer end of and projects radially outward from the drive axle 16; a wheel hub 20 which is secured to the drive axle hub 18 for rotation with the powered drive axle 16; and tapered roller bearing(s) 22 which rotatably support the wheel hub 20 on the axle spindle 14. The powered tandem axle assembly will also include a single or pair of wheels and tires 24 and 26 which will be mounted on the wheel hub 20.

The rotary union assembly 10 is effective for allowing air from an onboard automatic tire inflation systems or another source automatically to flow through one or more air outlet tubes or other conduits 28 which extend through the drive axle hub 18 to a leaking tire. Flexible hoses or other conduits 30 can be readily secured to the outer ends of the air outlet tubes 28 for delivering air to the tires 24 and 26 of the powered axle assembly 12. As with the systems used heretofore for maintaining inflation in the tires of non-powered axle assemblies, check valves or other devices can be provided in the air lines 30 extending from the air outlet tubes 28 in order to allow limited deflation but prevent complete deflation of the tires 24 and 26.

Figure 3:
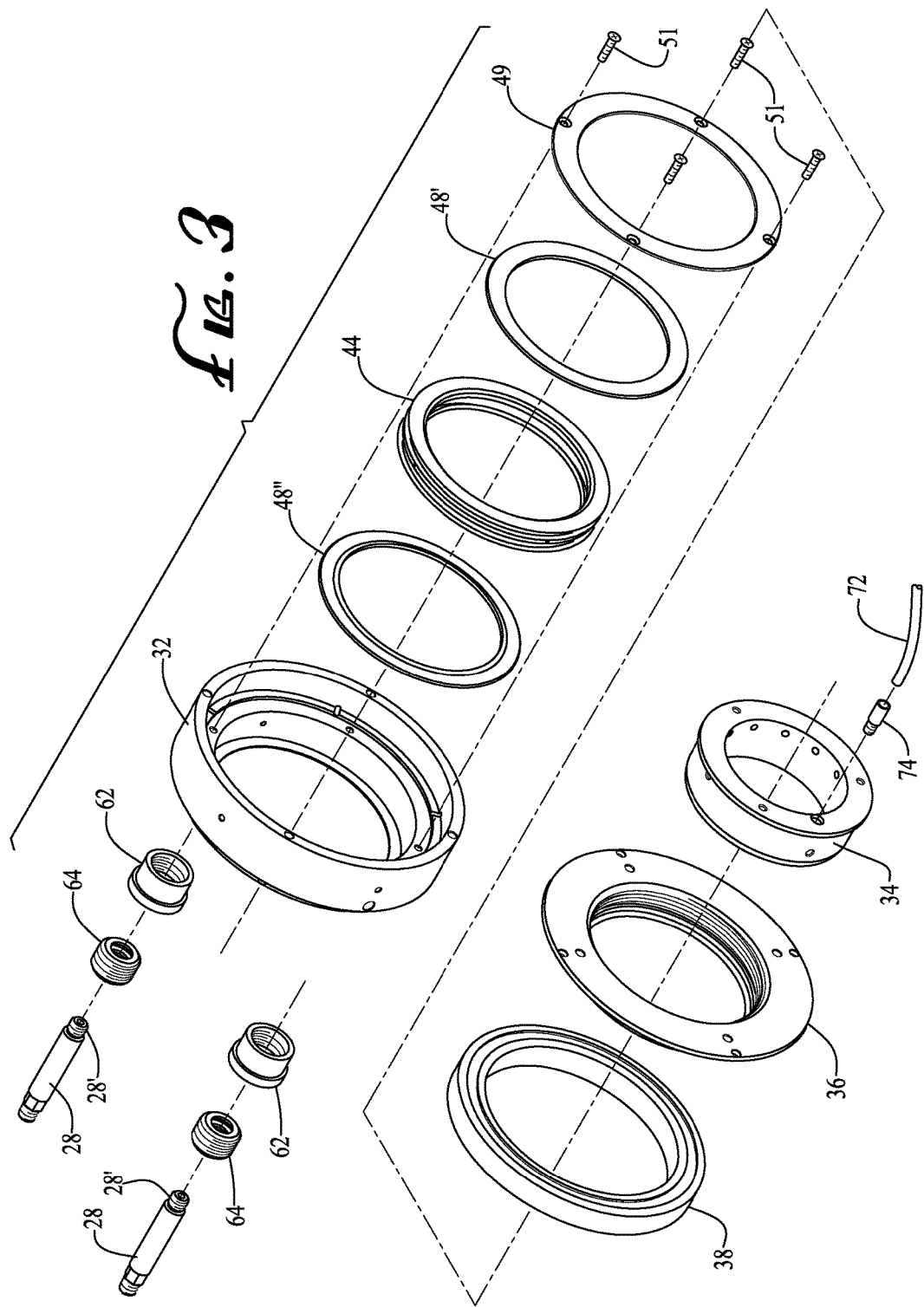
FIG. 3 is an exploded view of the inventive air delivery apparatus of the present invention.
Figure 4:
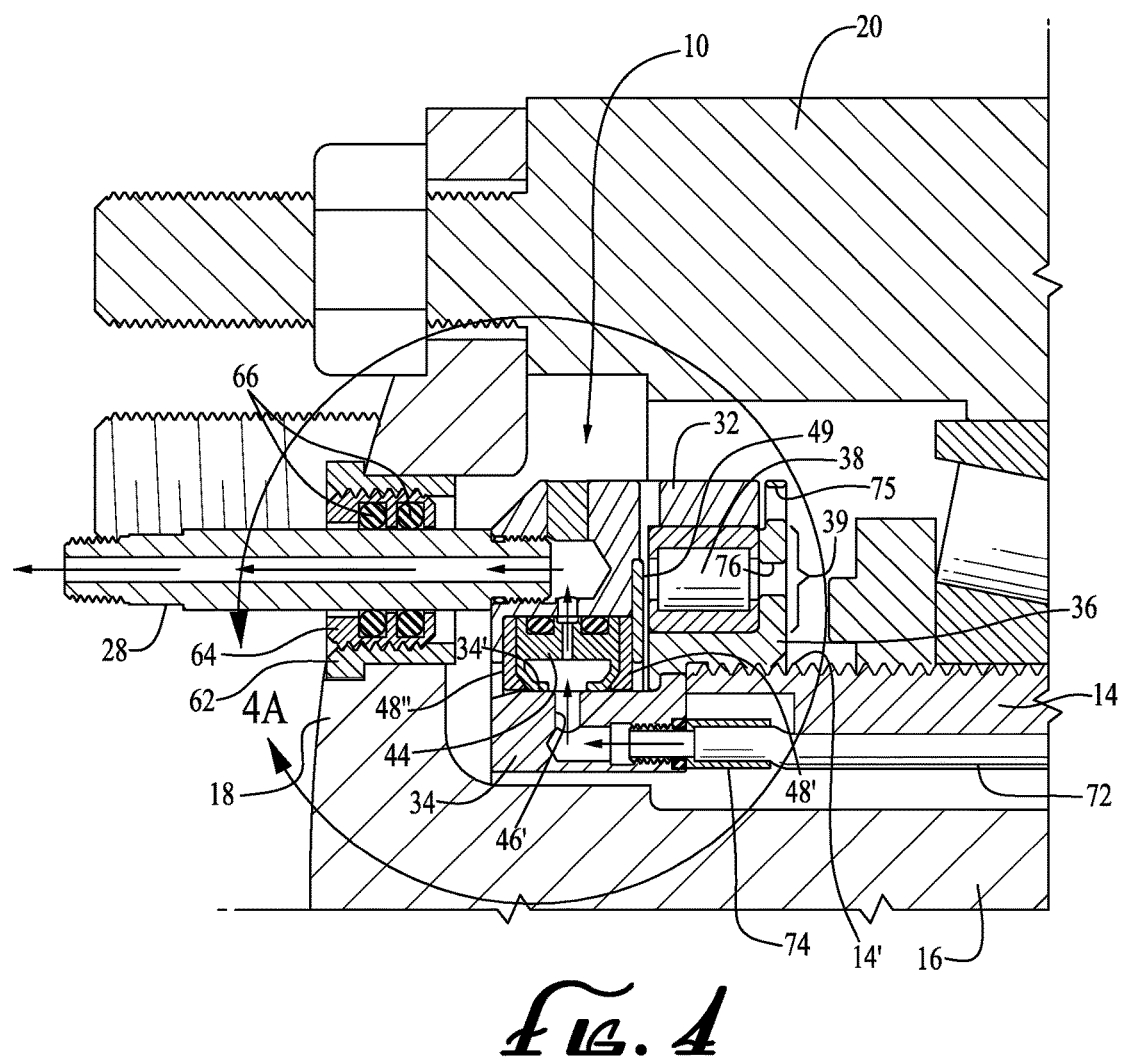
FIG. 4 is an assembled cutaway elevational side view of the inventive air delivery apparatus of the present invention taken about line 4 in FIG. 1 and illustrating the air flow therethrough.
Figure 4A:
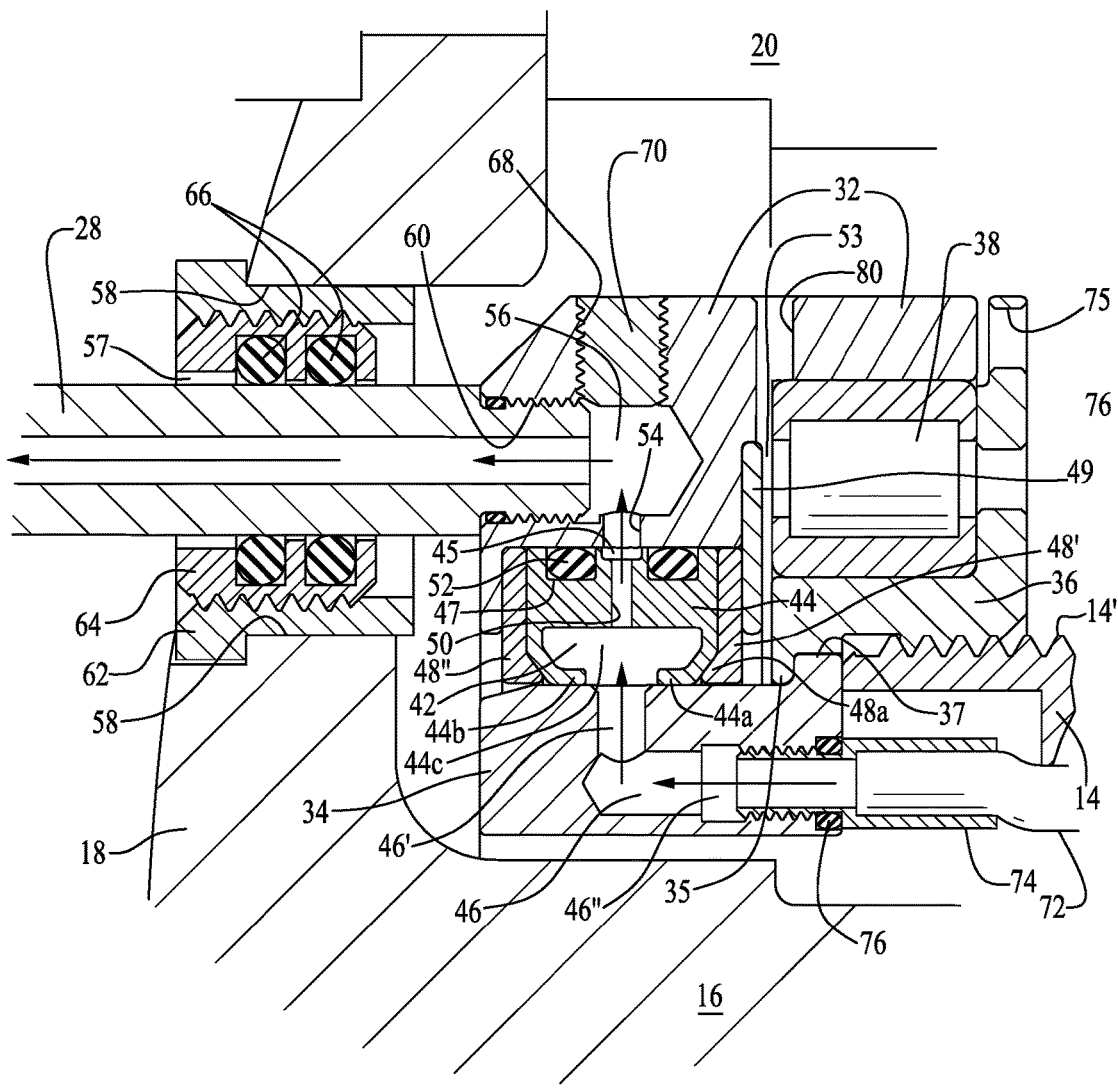
FIG. 4A is an enlarged assembled cutaway elevational side view of a portion of the inventive air delivery apparatus of the present invention taken about line 4A in FIG. 4 and illustrating the air flow therethrough.

The embodiment of the rotary union assembly 10 illustrated in FIGS. 1-10 comprises a rotor 32 (see FIG. 7) which is rotatably mounted proximate the outer end of the axle spindle 14 about a stationary base 34 (see FIG. 9) and is driven by the powered axle 16 such that the rotor 32 rotates with respect to the base 34 and with respect to the axle spindle 14. A locking ring 36 (see FIG. 8) is positioned about and threadably engages an outer end portion 14' of the spindle 14 and holds the rotor 32 in place about the base 34 and secures the base to the spindle. As illustrated in FIG. 4A, the inner downstream end of the locking ring defines a radial end flange 35 that overlaps and mates with a corresponding flange 37 on the upstream end of the base. Thus, when the locking ring 36 is threaded onto the end 14' of the spindle, the base is pulled against the spindle and held in place by the locking ring. In this embodiment of the invention, the locking ring 36 is configured so as to also secure the rotor in place by cooperating with the rotor to receive therebetween a roller bearing 38 in a press fitment within an open annular area 39 between the locking ring and the upstream end of the rotor, as seen, for example, in FIG. 4.

The above described assembly defines an interior air chamber 42 between the rotor 32 and base 34. An annular sealing member 44 (see FIG. 10) is provided within the air chamber 42 for sealing the air chamber. An air passageway 46 is machined or otherwise formed in the base 34 for delivering air therethrough into the air chamber 42 in a radial direction, as will be described.

In the embodiment of the present invention illustrated in FIGS. 1-10, the sealing member 44 preferably is of the double-lipped seal type and can be formed of any suitable material for conforming to the walls of the air chamber 42 and providing a sealing interface between the base 34 and the rotor 32 and, if utilized, with a pair of laterally disposed seal supporting rings 48' and 48" positioned adjacent to the opposed lateral sides of the sealing member 44. The material of which the sealing member 44 is formed will preferably have a low friction coefficient and high wear resistance. Examples of suitable materials include, but are not limited to: polytetrafluoroethylene (PTFE); mixtures of PTFE, glass fiber, and molybdenum disulfide; mixtures of PTFE and carbon; and rubber compounds such as VITON. The double-lipped seal 44 will most preferably be formed from PTFE impregnated with graphite.

Figure 5:
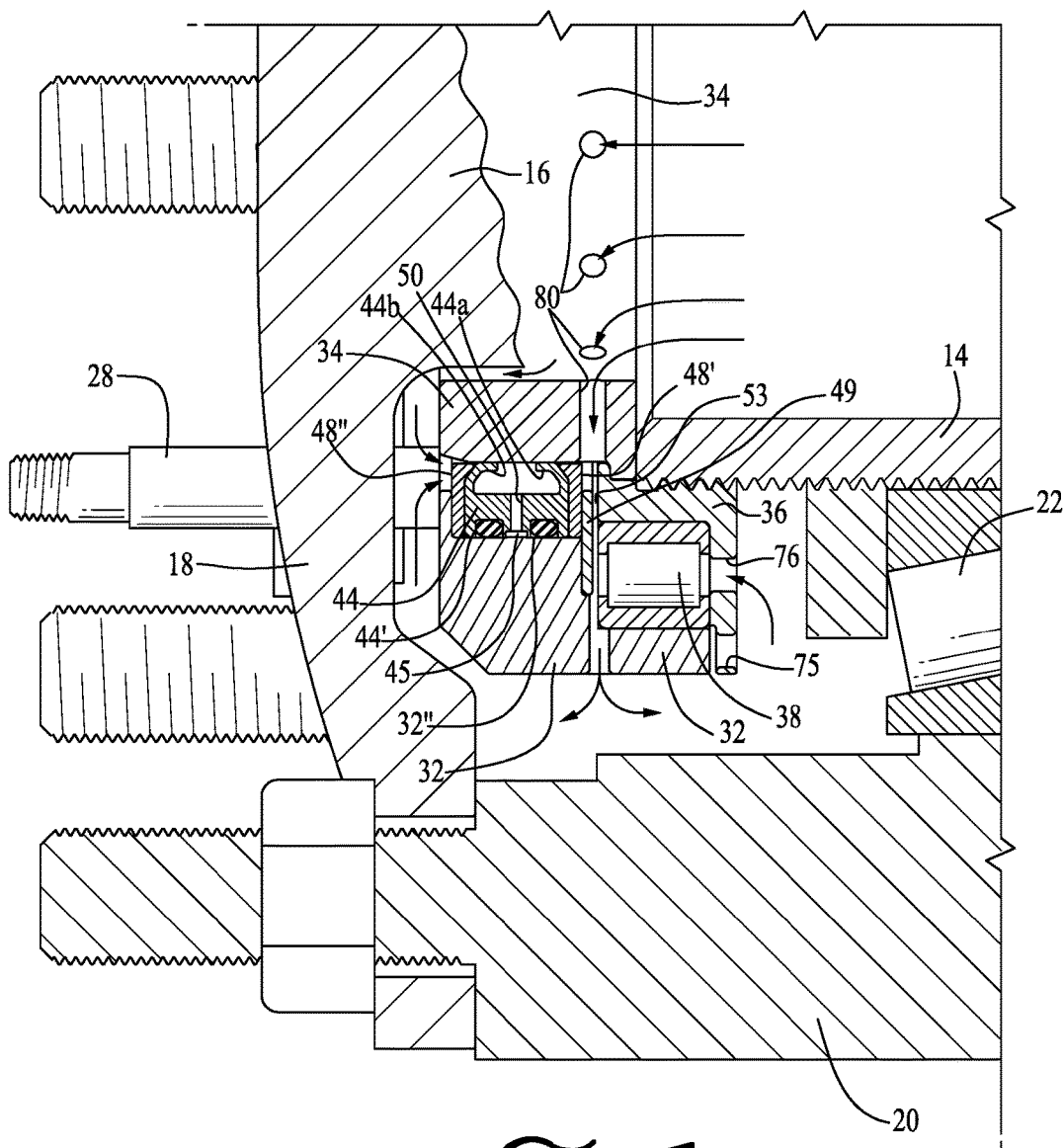
FIG. 5 is an assembled cutaway elevational side view of the inventive air delivery apparatus of the present invention taken about line 5 in FIG. 1 and illustrating the lubricating and cooling oil flow therethrough.

The seal supporting rings 48' and 48" may be utilized adjacent to the sealing member 44. These rings can be formed of a relatively rigid material such as aluminum and are utilized to provide lateral support for the sealing member 44 and prevent axial distortion of the sealing member 44 during use. Also, as shown in FIGS. 3, 4 and 5, an annular spacer 49 is secured to the rotor by tapered headed screws 51 and spans the juncture between the rotor and the upstream seal supporting ring 48' so as to prevent the pressurized air in chamber 42 from distorting the sealing member 44 while providing a spacing 53 between the rotating rotor 32, the sealing member 44 and upstream seal supporting ring 48' and the stationary locking ring 36 and roller bearing 38. As will be later described, spacing 53 forms a portion of the pathway for the lubricating oil for the rotary union assembly. In those applications, where there is inadequate room for the seal supporting rings or if for other reasons the supporting rings 48' and 48" are not utilized, the lateral side walls of the rotor 32, locking ring 36 and annular spacer 49 can be configured so as to abut and cooperate with the opposing side walls of the sealing member 44 to provide the necessary lateral support for the sealing member.

The outer annular face 44' of the sealing member 44 defines a centrally disposed recessed annular outer air flow channel 45 therein and a pair of laterally spaced annular recesses 47 disposed on opposed sides of channel 45 in which a pair of o-ring seals 52 are retained. The opposed inner surface 44" of the sealing member defines a pair of axially spaced and inwardly extending annular sealing lips 44a and 44b and an inner air flow channel 44c therebetween. The o-rings 52 in the outer face of the sealing member bear against the annular interior surface 32' of the rotor in sealing engagement therewith while the extended sealing lips 44a and 44b projecting from opposed sides of the inner face of the sealing member bear against and are in sealing engagement with the side walls of air chamber 42 or the seal supporting rings 48' and 48" (if utilized) and with the outer surface 34' of the base 34 on opposed sides of the air outlet end 46' of the air passageway 46 therein as is also best seen in FIGS. 4 and 4A. As illustrated therein, the sealing lips 42a and 44b preferably comprise radial portions 44a' and 44b' projecting inwardly from opposed sides of the sealing member that merge into inwardly inclined portions 44a" and 44b" that terminate in inwardly facing opposed distal end portions 44a'" and 44b'". Upon pressurized airflow being directed into air chamber 42 through air flow channel 44c and causing a pressure buildup within air chamber 42, such a double lip seal configuration provides significantly enhanced sealing engagement between the stationary and rotary structures of the drive axle assembly. A plurality of equidistantly spaced air passageways 50 (four being shown) extend radially through the sealing member 44, communicating the inner air flow channel 44c with the outer channel 45.

Figure 10A:
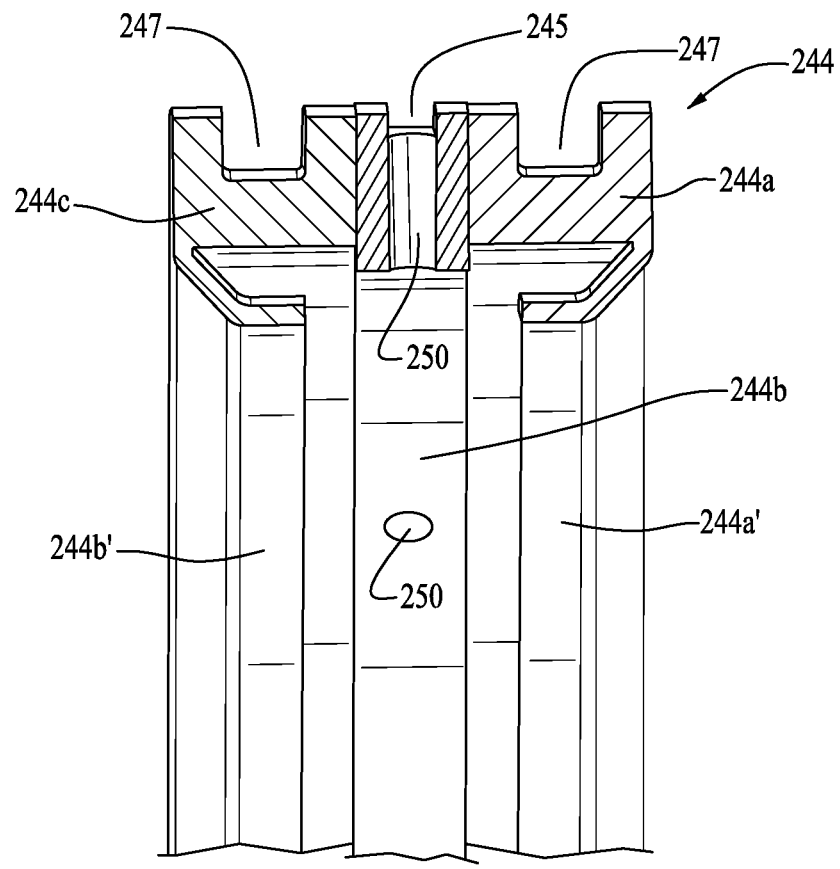
FIG. 10A is an enlarged partial perspective view of a portion of a multi-piece alternate embodiment of the annular double-lip seal illustrated in FIG. 10.
Figure 11:
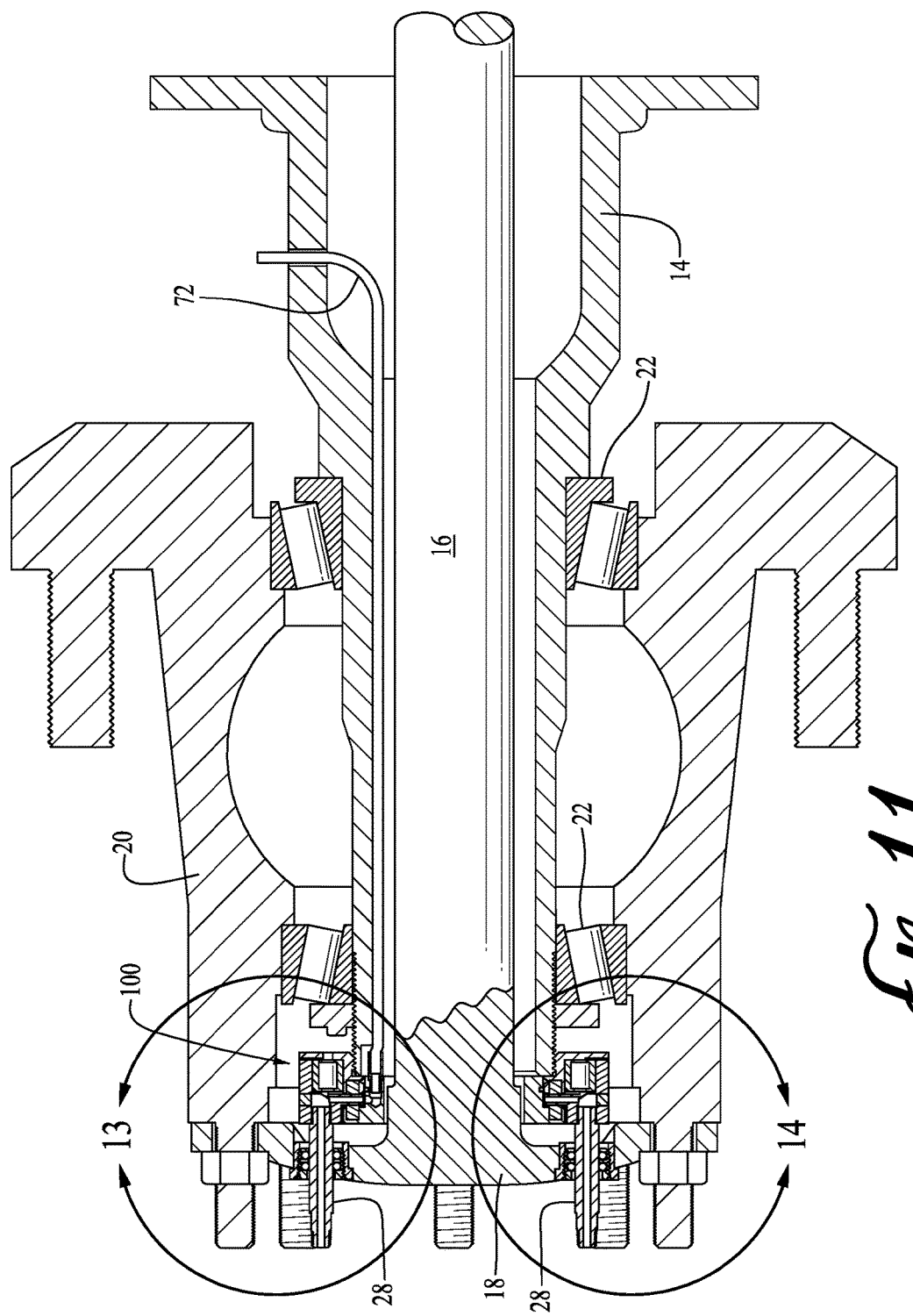
FIG. 11 is a cutaway elevational side view of a powered axle assembly having an alternate embodiment of the inventive air delivery apparatus incorporated therein.
Figure 12:
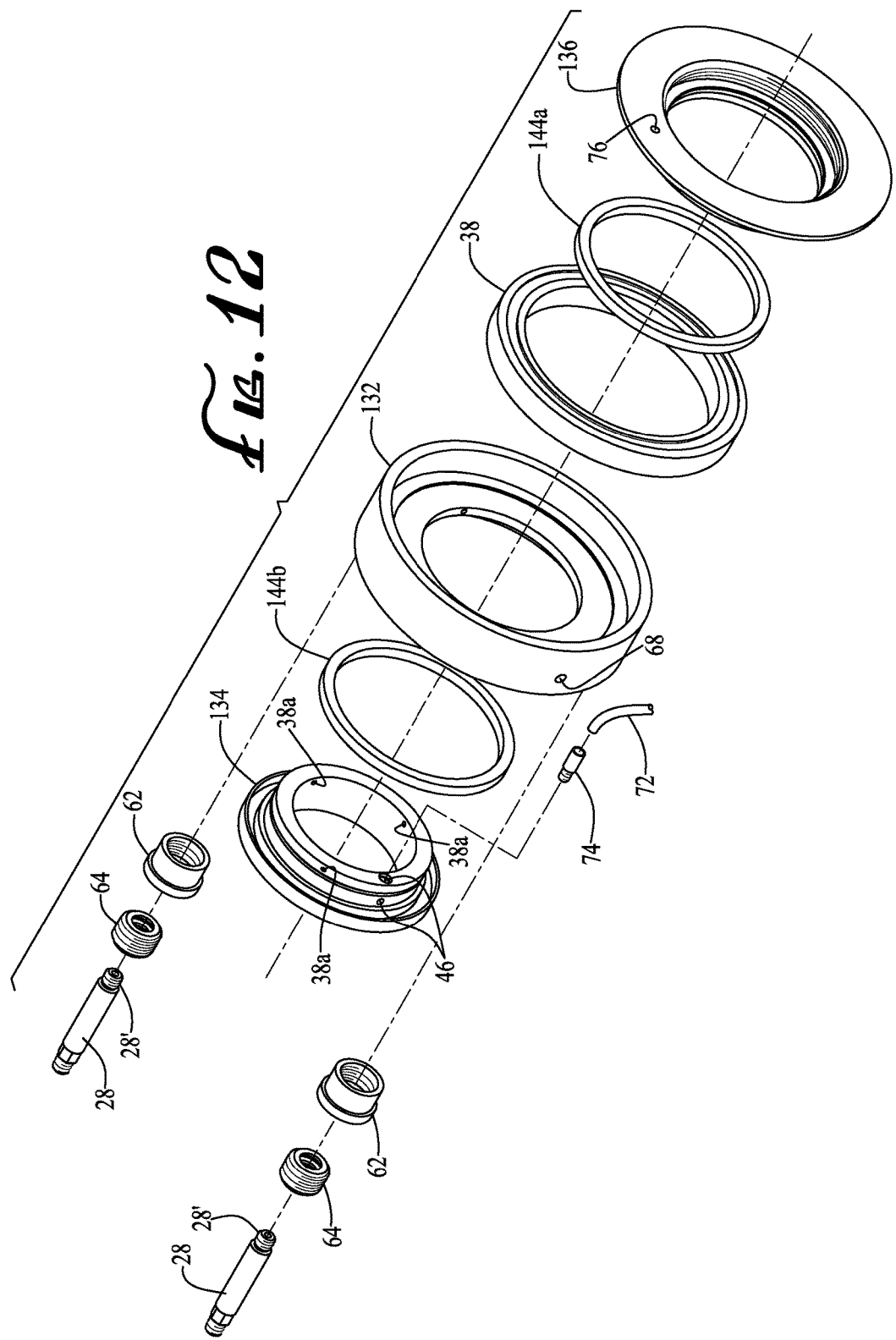
FIG. 12 is an exploded view of the alternate embodiment of the inventive air delivery apparatus of the present invention illustrated in FIG. 2.
Figure 13:
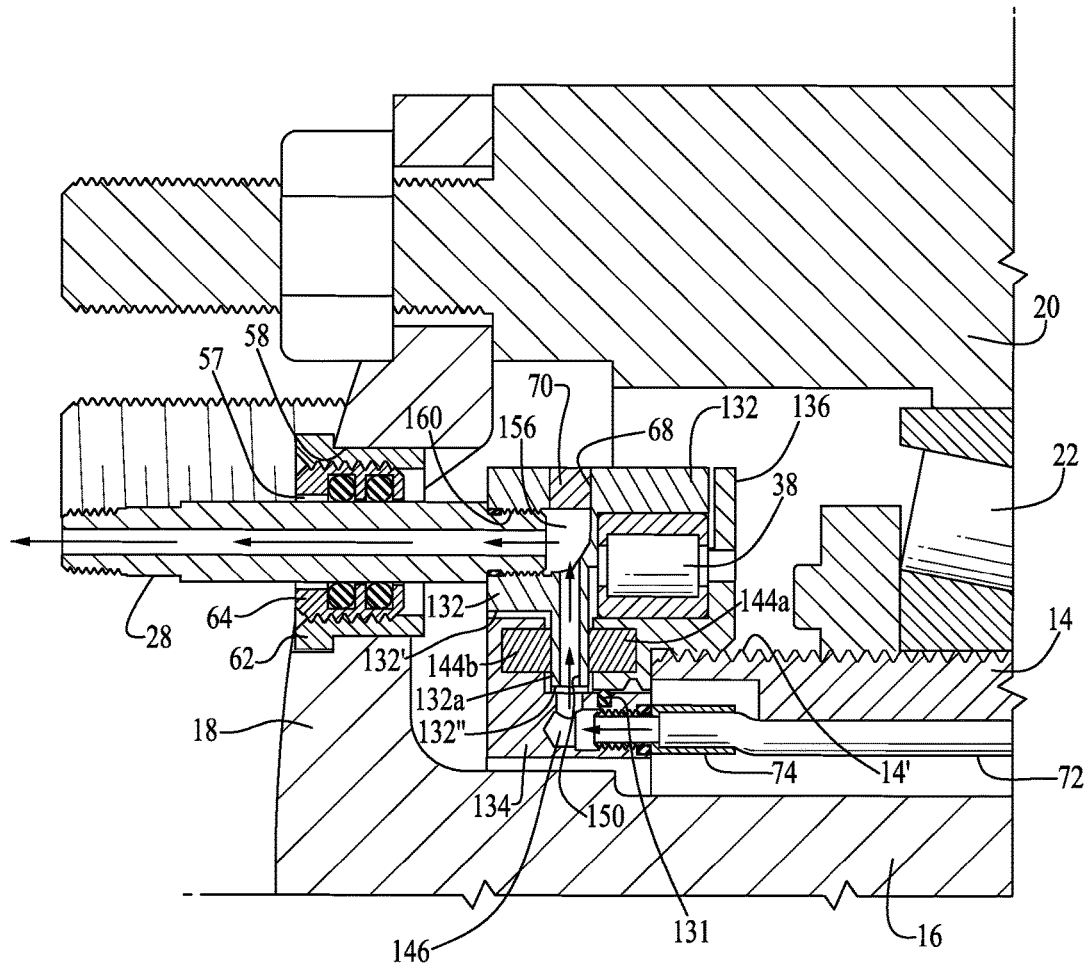
FIG. 13 is a sectional side view taken about the line 13 in FIG. 11.
Figure 14:
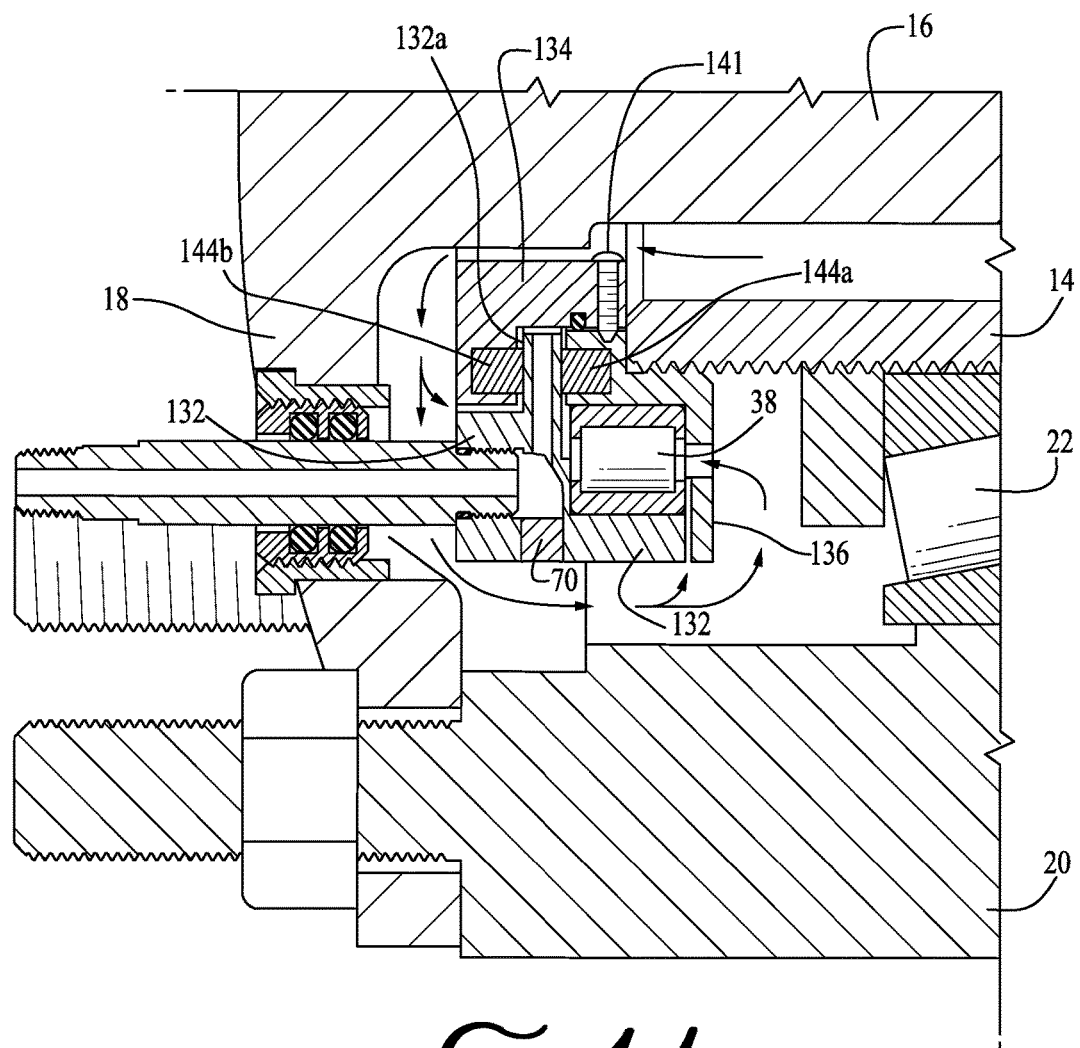
FIG. 14 is a sectional side view taken about the line 14 in FIG. 11.
Figure 15:
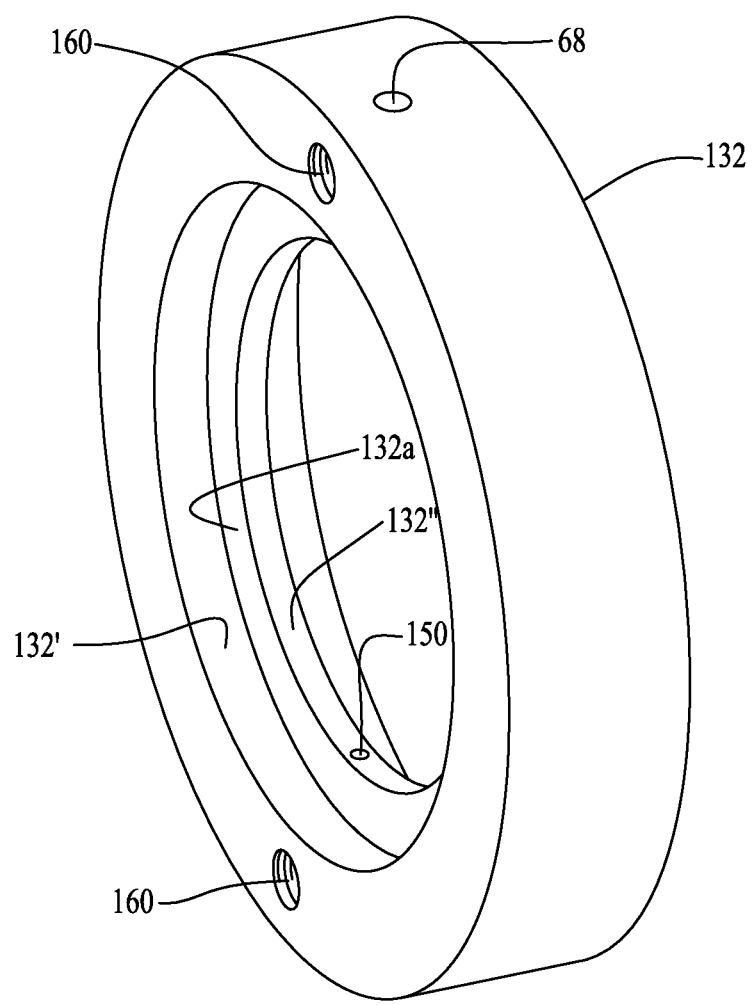
FIG. 15 is a perspective view of the rotor employed in the alternate embodiment of the present invention.
Figure 16:
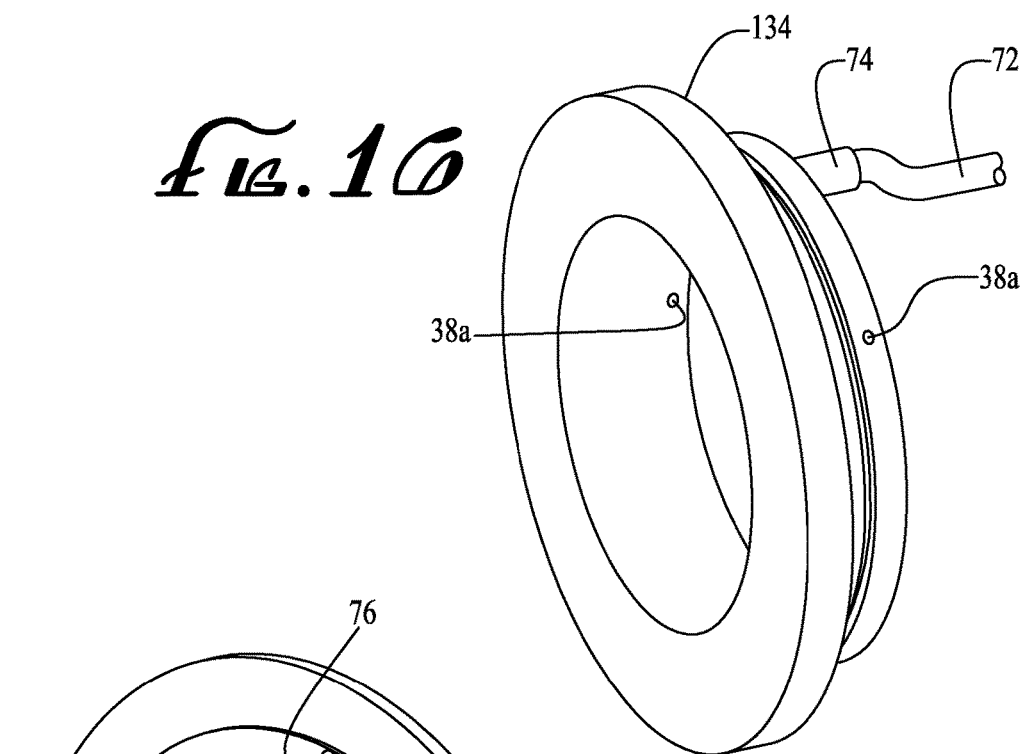
FIG. 16 is a perspective view of the stator and air inlet tube employed in the alternate embodiment of the present invention.
Figure 17:
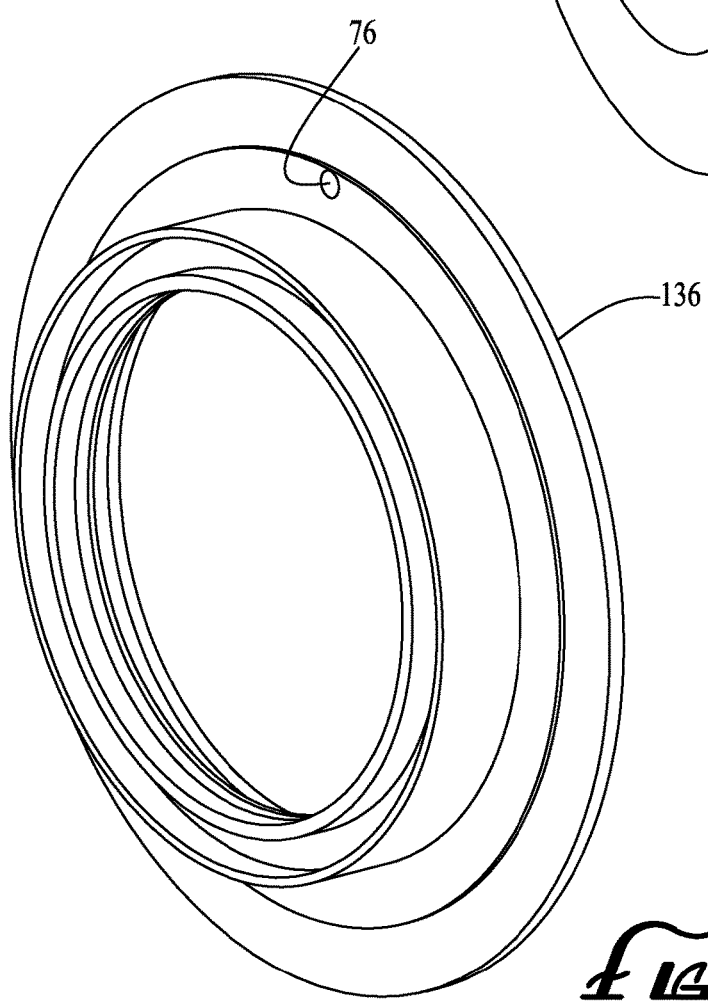
FIG. 17 is a perspective view of the locking ring employed in the alternate embodiment of the present invention.

While the sealing member 44 is generally illustrated as being of single-piece construction, to facilitate the formation of the sealing member, it may be desirable to form the sealing member multiple sections which could be held together by mechanical or chemical means. One example of such a configuration is illustrated in FIG. 10A wherein the sealing member 244 is comprised of three sections 244a, 244b and 244c. The two outer sections 244a and 244c can be of a configuration substantially identical to the lateral portions of the single-piece sealing member 44 and can be formed of the same material as sealing member 44. For cost savings, the center section 244b preferably can be formed of a rigid metal or plastic material, such as aluminum or Delrin®, as center section 244b is not in contact with any stationary elements. Seal section 244b defines a recessed annular air channel 245 extending about the perimeter thereof and a plurality of equidistantly spaced air passageways 250 extending radially therethrough and communicating with annular channel 245, similar to the annular channel 45 and passageways 50 in the single-piece embodiment of sealing member 44. The two outer sections 244a and 244c each define an annular recess 247 extending about the perimeter thereof for retaining an o-ring (not shown) therein in the same manner as the single-piece sealing member defines annular recesses 47 for retaining o-rings 52. The opposed inner surfaces of lateral sealing sections 244a and 244c would define the two lip seals 244a' and 244b' for the multiple piece sealing member 244. Upon the three sections 244a-c being held in adjacent axial alignment, the resultant sealing member 244 can form the identical configuration as sealing member 44 and functions in the same manner.

In use, the sections of sealing member 244 are positioned within air chamber 42 and can be held together in axial alignment by means of a plurality of equidistantly spaced threaded fastening members (not shown) extending through an annular spacer (not shown) like spacer 49 and engage an adjacent seal support ring (not shown) like ring 48', such that upon tightening the fastening members, the extended ends thereof will abut and urge the adjacent seal support ring, the sealing member sections 244a-c and a second seal support ring like ring 48" against a downstream portion of the rotor and thereby hold each of the components of the sealing member together and in place. By utilizing such a multi-piece configuration for the sealing member, the lateral portions 244a and 244c thereof can be economically formed by injection molding and readily secured in place, as described, whereas the process for forming the double-lip seal sealing member 44 of a single-piece construction may be more time consuming and costly. It is to be understood that the term sealing member is used herein to describe a seal that can be of single-piece construction or that can comprise two or more components held together in an adjacent disposition.

The seal supporting rings 48' and 48" that can be employed adjacent to the sealing member 44 also preferably define inwardly tapered annular foot portions 48a extending about the interior perimeters of the seal supporting rings for directing the individual lip seals 44a and 44b inwardly along and against the base 34 to increase the area of contact therewith and provide a natural, outward flex in the sealing lips thereby enhancing the sealing engagement of the sealing member 44 with the base. Rotor 32 is preferably provided with a pair of air outlet openings 60 in the annular downstream end face 32' thereof and with a plurality of equidistantly spaced air flow apertures 54 in the inner annular surface 32" thereof (two such apertures being shown) for communicating the air passageway 46 through base 34 with the air outlet tubes 28 via the air chamber 42 between the base and rotor, the radial passageways 50 and the recessed channel 45 in the sealing member 44 and apertures 54, an annular air cavity 56 and air outlet openings 60 in the rotor 32 (see air flow arrows in FIGS. 4 and 4A).

The threaded attachment of the above described assembly onto the spindle is made difficult by the rotatable mounting of the rotor 32 with respect to the locking ring 36 and the base 34. The resulting assembly is difficult to grasp and rotate into threaded engagement with the spindle. To assist the installer, Applicant has provided a plurality of install pin holes 73 extending axially through a perimeter portion of the rotor 32 (four being shown) and a corresponding plurality of install pin holes 75 in an outer portion of the locking ring 36 such that upon rotating the rotor with respect to the locking ring, the install pin holes 73 in the rotor can be brought into axle alignment with the install pin holes 75 in the locking ring (see FIGS. 3, 7 and 8). By extending a suitable tool 77, such as a Phillips screwdriver, through one of the install pin holes 73 in the rotor, rotating the rotor until the screwdriver is axially aligned with one of the pin holes 75 in the locking ring and then inserting the screwdriver into the aligned pin install hole 75, further relative rotation between the rotor and the locking ring as well as the other components of assembly is prevented. By then inserting a second such tool 77 through a second pair of aligned pin install holes 73 and 75 in the rotor and the locking ring, the rotary union assembly can be threadably engaged with and tightened about the spindle using the two tools, whereupon the tools can be withdrawn. Such an assembly process is schematically illustrated in FIG. 6. If desired, an assembly tool (not shown) could be fabricated to effect such mounting. Such a tool, for example, could comprise a planar ring and two or more perpendicularly mounted install pins secured to and projecting perpendicularly from the ring for insertion into aligned pairs of the pin installment holes in the rotor and locking ring. An annular or other suitable gripping surface for rotating the tool to effect installation also could be provided. To prevent the rotary union assembly from backing off its threaded engagement with the axle spindle during use, a plurality of jam screws 40 preferably can be extended through a corresponding plurality of holes 38a formed in the base 34 (see FIGS. 6 and 9) so as to threadably engage the axle spindle 14.

In a modification (not shown) of the present invention, the orientation of the sealing member 44 within air chamber 42 could be reversed such that the previously described outer face 44' of the sealing member defining the recessed channel 45 and carrying o-rings 50 could be disposed against the outer surface of the base 34, preferably within a recessed area formed on the outer surface 34' of the base 34 to inhibit lateral movement of the sealing member, such that the o-ring seals 52 then would bear against the base on opposed sides of the air outlet end 46' of the air passageway 46 in sealing engagement with the base. The extended sealing lips 44a and 44b on sealing member 44 would bear against the interior surface 32' of the rotor in sealing engagement therewith on opposed sides of the air flow apertures 54 disposed therein.

The air outlet tubes 28 of the inventive apparatus extend through axial bores 58 formed through the drive axle hub 18. The inlet ends 28' of the tubes extend into corresponding air outlet passageways or openings 60 provided in the rotor so as to communicate the inlet ends of the tubes 28 with air cavity 56 and apertures 54 within the rotor 32. Thus, in the present embodiment, radial passageways 50, the recessed channel 45' in the sealing member 44, apertures 54, air cavity 56 and openings 60 collectively define air outlets for rotor 32.

Preferably, the air outlet tubes are mounted in a manner so as to permit the tubes to pivot slightly to some degree with respect to the drive axle hub or plate. To provide such movement, the upstream ends of the tubes can threadably engage the rotor about openings 60 and the axle hub can be provided with axle inserts 62 that are held in bores 58 by brazing, a press fitment or an adhesive such as a liquid solder adhesive. The axle inserts 62 threadably engage an axle plug 64 and carry a pair of o-ring seals 66 in a parallel disposition (see FIG. 4). A slight clearance 57 preferably is provided between the outer surface of the outlet tubes and their respective axle plugs whereby the o-rings can allow for the slight flexing of the outlet tubes while maintaining oil-tight seals about the tubes.

In addition to permitting air flow to the exterior of the powered axle assembly, the positioning of the outlet air tubes 28 through the drive axle hub 18 also links the rotor 32 with the powered drive axle 16 to thus cause the rotor to rotate with the drive axle and to align the rotor relative to the axis of rotation of the drive axle. Because of the radial entry of air into the air chamber 42 through the sealing member 44 and into the air cavity 56, there is minimal outward axial thrust created by the pressurized air flow on the air tubes, simplifying the mounting of the air outlet tubes to the rotor.

Air from an onboard automatic tire inflation system or other source is supplied to the rotary union assembly 10 by air inlet tube 72 which can be attached to the base 34 by means of an air inlet tube fitting 74 or brazed joint that can threadably engage the air inlet end 46" of air passageway 46 within the base. An o-ring seal 76 can be disposed between the downstream end of the air inlet 74 and the surrounding base 34 as is also shown in FIGS. 4 and 4A.

Thus, in the event that a tire leak or puncture occurs or a tire pressure adjustment is needed, make-up air from the onboard automatic tire inflation system will flow sequentially through the air inlet tube 72, the air passageway 46 in the base 34 which directs the pressurized air into air chamber 42 in a radial direction, urging the sealing member 44 outwardly against the interior annular surface 32' of the rotor 32, against the sealing supporting rings 48' and 48" (if utilized) and spacer 49 and the extended sealing lips 44a and 44b outwardly and inwardly against the seal supporting rings 48' and 48" (again, if utilized) and base 34. The forces acting on the sealing member 44 are balanced and well contained by the structures surrounding the sealing member. Air flow proceeds from chamber 42 radially through the passageways 50 in the sealing member into and about the annular recessed channel 45 in the annular outer face 44' of the sealing member and through the openings 54 in the rotor as the rotor and sealing member rotate together with respect to the base and locking ring. The air passing from channel 45 outwardly through the air openings 54 in the rotor enters the air cavity 56 in the rotor and exits the air outlet tubes 28 via openings 60 in the rotor to the air lines 30 and tire(s) 24 and/or 26.

Also, as seen in FIG. 4, an opening 68 can be provided in the outer surface of the rotor 32 in axial alignment with one of the air flow apertures 54 in the rotor 32 to facilitate the drilling of the flow apertures 54. Opening 68, is covered by a plug 70 after assembly to prevent air leakage therethrough. Plug 70 is preferably secured by threaded engagement with the rotor about opening 68. Also, rather than using an air inlet tube 72, an inlet air passageway for delivering air to the rotary union assembly 10 could alternatively be drilled or bored axially through the non-rotating axle spindle 14 itself.

In order to lubricate and cool the rotor 32, sealing member 44 and associated components, the present invention utilizes the rotating axle while taking advantage of the adhesive and cohesive properties of the oil to lubricate and cool these components. The lower portion of the spindle in which the axle rotates, is partially filled with lubricating oil. As the axle rotates within the spindle, the axle acts as an oil slinger, throwing the oil about the spindle. The distribution of the oil about the rotary union assembly for lubrication and cooling is illustrated in FIG. 5 and the particular oil flow holes provided in the components of the rotary union are illustrated in FIGS. 7-10. As seen therein, a plurality of radially oriented oil flow holes 80 (four being shown) are provided in the outer annular surface of the rotor 32. A corresponding plurality of axially oriented oil flow holes 76 are provided in the locking ring 36 (see FIGS. 3 and 8) and a larger plurality of radially oriented oil flow holes 78 are provided in the annular surface of the base 34 (see FIGS. 3 and 9). As a result, the oil thrown by the rotating axle passes through and about the base and the rotor and about the sealing member and roller bearing 38 as illustrated by the arrows in FIG. 5, effecting a lubricating and cooling of the rotating and adjacent components. Thus, the adhesive property in the lubricating oil causes the oil to adhere to the various components to effect the lubrication and cooling thereof while the cohesive property of the oil allows the oil to be drawn by the centrifugal force generated by the axle in a wick-like fashion through and about the components as above described and illustrated in FIG. 5.

An alternate embodiment of the inventive apparatus is illustrated in FIGS. 11-17. As seen therein, the modified rotary union assembly 100 primarily differs from the assembly 10 of the prior embodiment in the configuration and sealing engagements of the respective sealing members. Unlike sealing member 44 which rotates with the rotor 32 and effects a rotating seal with a stationary base, the sealing member in this alternate embodiment is comprised of a pair of stationary annular sealing members 144a and 144b in the form of rings or discs, preferably rectangular in cross-section, that effect sealing engagements with the rotating rotor 132.

The annular sealing members 144a and 144b can be formed of the same material as seal 44 with sealing member 144a being carried by the locking ring 136 and sealing member 144b being carried by the base 134. (See, e.g., FIG. 13.) Each of the two sealing members can be held in a press fitment within correspondingly configured areas within the locking ring and base such that the opposed inner surfaces of the two sealing members bear against opposed side walls of a radial projection 132a extending inwardly about the annular interior surface 132' of the rotor 132 as seen, in FIGS. 13 and 14. A pair of opposed radially aligned air flow passageways 150 preferably extend through the rotor 132 and radial projection 132a, communicating an air passageway 146 in the base 134 with the air outlet tubes 28 via cavity 156 and openings 160 in the rotor 132 for providing pressurized air flow to the air lines and tires as previously described in discussing the prior embodiment of FIGS. 1-10.

To maintain the rotary seals effected by sealing members 144a and 144b with the opposed side walls of the radial projection 132a on rotor 132, a plurality of threaded fastening members 141 (one being shown in FIG. 14) can threadably engage and extend inwardly through the base 134 and into locking ring 136 so as to prevent axial separation between the base and locking ring which would otherwise cause the seals to fail. To prevent the rotary union assembly 100 from backing off its threaded engagement with the axle spindle during use, a plurality of jam screws (not shown) can be extended through a corresponding plurality of holes (also not shown) formed in either the base 134 or the locking ring 136 so as to threadably engage the axle spindle 14 and prevent relative rotation therebetween. A similar securement of the base 34 to the locking ring 36 was discussed earlier therein with respect to rotary union assembly 10. Also, a plurality of install pin holes (not shown), can extend axially through a perimeter portion of the rotor 132 and the locking ring 136 to accommodate a suitable tool for holding the rotor, base and locking ring in a fixed relative disposition to assist the installer in effecting the threaded engagement of the rotary union assembly 100 onto the spindle 14 in the same manner as described earlier herein in connection with the threaded attachment of the rotary union assembly 10. The remaining features of rotary union assembly 100 and surrounding environment are substantially the same as in assembly 10 and in such instances, the same reference numerals used in FIGS. 1-10 are generally carried over into FIGS. 11-17. Rotary union assembly 100, like assembly 10, also includes lubrication passageways which are illustrated by the oil flow arrows in FIG. 14 and again utilizes the previously discussed oil slinger effect provided by the rotating axle to lubricate and cool adjacent rotating and stationary components.

The use of the two annular sealing members 144a and 114b in sealing engagement with the opposed side walls of a radial projection 132a extending about the rotor 132 through which the pressurized air is radially directed into the interior of the rotary union assembly 100 provides even greater protection against possible air leakage in the event of run off resulting from off center wheel mountings.

Although the present invention has been described by way of exemplary embodiments, it should be understood that many changes and substitutions may be made by those skilled in the art without departing from the spirit and the scope of the present invention, which is defined by the appended claims.

What is claimed is:

1. In a powered axle assembly including a drive axle which extends longitudinally through a non-rotating structure and is powered for rotation within said non-rotating structure, a drive axle hub provided at an axial outer end of said drive axle which rotates with said drive axle and is positioned outside of an outer end of said non-rotating structure, a wheel hub secured to said drive axle hub and extending axially rearward, and at least one bearing which supports said wheel hub on an exterior of said non-rotating structure for rotation of said wheel hub around said exterior of said non-rotating structure, the improvement comprising:

a base operatively connected to said non-rotating structure and having said drive axle extending therethrough, said base being positioned within an interior of said wheel hub;

a rotor having said drive axle extending therethrough and mounted within said interior of said wheel hub for rotation with said drive axle hub such that said rotor will rotate with respect to said base, said rotor being configured so as to form an air cavity therein, said air cavity encircling said drive axle and being located within said interior of said wheel hub;

said base including at least one air passageway extending therethrough for delivering air to said air cavity in a radial direction relative to the drive axle;

said rotor including at least one air outlet for air flow out of said air cavity and defining an annular projection extending radially from and about said rotor and at least one air passageway extending radially through said projection and communicating said at least one air passageway in said base with said air cavity and with said at least one air outlet;

a locking ring operatively securing said base to said non-rotating structure and said rotor proximate said base;

a first annular sealing member carried by said base;

a second annular sealing member carried by said locking ring; and wherein said first and second sealing members abut and form sealing engagements with opposed sides of said annular projection on said rotor as said rotor rotates with respect to said base and said sealing members.

2. The powered axle assembly of claim 1 wherein said at least one passageway extending through said base defines an upstream axial portion for receiving air from a pressurized source and a downstream radial portion for directing air from said axial portion radially into said air cavity through said at least one air passageway in said radial projection.

3. The powered axle assembly of claim 1 wherein the improvement further comprises a bearing disposed in a press fitment between portions of said locking ring and said rotor so as to urge said portions of said locking ring and rotor in opposed radial directions thereby effecting the operative securement of said rotor proximate said base while allowing rotation of said rotor with respect to said base.

4. The powered axle assembly of claim 1 wherein said locking ring threadably engages a portion of the non-rotating structure and including a plurality of fastening members securing said locking ring to said base whereby axial separation of said locking ring and said base is prevented and the sealing engagement of said sealing ring with said radial projection on said rotor is maintained.

5. The powered axle assembly of claim 1 wherein at least a portion of the interior of the non-rotating structure contains sufficient lubricating oil such that rotation of the axle through the oil slings droplets of oil outwardly therefrom and including a plurality of oil passageways communicating with the interior of said non-rotating structure and extending about and between said rotor, said first and second sealing members, said base, and said locking ring, said oil passageways receiving and directing the droplets throughout said oil passageways thereby lubricating said rotor and said sealing member for rotational movement with respect to said base and said locking ring and dissipating heat generated by such rotation.

6. The powered axle assembly of claim 5 wherein the improvement further comprises a bearing disposed in a press fitment between portions of said locking ring and said rotor so as to urge said portions of said locking ring and rotor in opposed radial directions thereby effecting the operative securement of said rotor proximate said base while allowing rotation of said rotor with respect to said base.

7. In a powered axle assembly including a drive axle which extends longitudinally through a non-rotating structure and is powered for rotation within said non-rotating structure, a drive axle hub provided at an axial outer end of said drive axle which rotates with said drive axle and is positioned outside of an outer end of said non-rotating structure, a wheel hub secured to said drive axle hub and extending axially rearward, and at least one bearing which supports said wheel hub on an exterior of said non-rotating structure for rotation of said wheel hub around said exterior of said non-rotating structure, the improvement comprising:

a base operatively connected to said non-rotating structure and having said drive axle extending therethrough, said base being positioned within an interior of said wheel hub and defining at least one passageway extending therethrough for communication with a pressurized air source;

a rotor having said drive axle extending therethrough and mounted within said interior of said wheel hub for rotation with said drive axle hub such that said rotor will rotate with respect to said base, said rotor defining at least one air outlet therein and an annular projection extending radially from and about said rotor and at least one air passageway extending radially through said projection and communicating said at least one air passageway in said base with said at least one air outlet; and a pair of annular sealing members fixed in an axially aligned disposition, said sealing members abutting and forming sealing engagements with opposed sides of said annular projection on said rotor as said rotor rotates with respect to said base and said sealing members.

8. The powered axle assembly of claim 7 including a locking ring operatively securing said base to said non-rotating structure and said rotor proximate said base and a bearing disposed in a press fitment between portions of said locking ring and said rotor so as to urge said portions of said locking ring and rotor in opposed radial directions thereby affecting the operative securement of said rotor proximate said base while allowing rotation of said rotor with respect to said base.

9. The powered axle assembly of claim 8 wherein one said sealing members is carried by said base and the other of said sealing members is carried by said locking ring.

* * * * *